United States Patent [19]

Teel, Jr. et al.

[11] Patent Number: 5,239,538

[45] Date of Patent: Aug. 24, 1993

[54] CONTROLLER ARCHITECTURE FOR RF TRUNKING DISTRIBUTED MULTISITE SWITCH

[75] Inventors: James L. Teel, Jr., Goode; Philip C. Gulliford, Forest; Charles P. Brame, Forest; Timothy F. Cree, Forest; Wim A. Improm, Forest, all of Va.

[73] Assignee: Ericsson GE Mobile Communications, Inc., Lynchburg, Va.

[21] Appl. No.: 658,798

[22] Filed: Feb. 22, 1991

[51] Int. Cl.$^5$ .............................................. H04J 3/02
[52] U.S. Cl. ..................................... 370/58.3; 370/67; 370/85.1; 370/85.9; 370/85.11; 379/58; 379/59; 379/63; 455/33.1; 455/33.4
[58] Field of Search ................... 370/67, 85.9, 85.11, 370/85.1, 58.3; 379/58, 59, 63; 455/33.1, 33.4

[56] References Cited

U.S. PATENT DOCUMENTS

| | | |
|---|---|---|
| 4,012,597 | 3/1977 | Lynk, Jr. et al. |
| 4,188,582 | 2/1980 | Cannalte et al. ...................... 325/58 |
| 4,268,722 | 5/1981 | Little et al. ........................ 179/2 EB |
| 4,451,827 | 5/1984 | Kahn et al. ..................... 340/825.52 |
| 4,488,290 | 12/1984 | Dunn et al. ........................ 370/67 X |
| 4,550,402 | 10/1985 | Gable et al. ........................... 370/85 |
| 4,578,815 | 3/1986 | Persinotti ............................. 455/15 |
| 4,590,467 | 5/1986 | Lare ................................. 340/825.5 |
| 4,630,263 | 12/1986 | Townsend et al. ..................... 370/85 |
| 4,792,948 | 12/1988 | Hangen et al. ........................ 370/95 |
| 4,926,495 | 5/1990 | Comroe et al. ....................... 455/54 |
| 4,975,903 | 12/1990 | Wakerly et al. ...................... 370/67 |

FOREIGN PATENT DOCUMENTS 2075799A 11/1981 United Kingdom .
WO91/16797 10/1991 World Int. Prop. O. .

OTHER PUBLICATIONS

Motorola Centracom Series II Control Center Systems, Field Maintenance Manual, Jun. 5, 1985.

Primary Examiner—Douglas W. Olms
Assistant Examiner—Russell W. Blum
Attorney, Agent, or Firm—Nixon & Vanderhye

[57] ABSTRACT

A radio frequency (RF) signal transmission system is interconnected by a multisite switch that routes command and audio transmission signals between the RF systems. The multisite switch has a distributed architecture of nodes wherein each node is coupled to one of the RF systems, such as a site controller or dispatcher console. Each of the switch nodes has a common architecture in which a single controller board operates a plurality of audio boards. In addition, the controller board has two principal processors that communicate with each other via a dual-port RAM.

4 Claims, 5 Drawing Sheets

CONTROLLER ARCHITECTURE FOR RF TRUNKING DISTRIBUTED MULTISITE SWITCH

RELATED APPLICATIONS

This application is related to the following copending commonly assigned U.S. patent applications.

This application is a continuation-in-part application to Ser. No. 07/573,977 entitled "Distributed Multisite Coordination System" filed on 28 August 1990 in the name of James L. Teel, Jr.

Application Ser. No. 07/532,164, filed Jun. 5, 1990, entitled "Fail-Soft Architecture for Public Trunking System"

Application Ser. No. 07/658,843, filed Feb. 22, 1991, entitled "Dynamic Address Allocation Within RF Trunking Multisite Switch"

Application Ser. No. 07/658,640, filed Feb. 22, 1991, entitled message "Bus Slot Update/Idle Control In RF Trunking Multisite Switch"

Application Ser. No. 07/658,637, filed Feb. 22, 1991, entitled "Protocol Between Console and RF Trunking System"

Application Ser. No. 07/658,636, filed Feb. 22, 1991, entitled "Audio Routing Within Trunked Radio Frequency Multisite Switch"

Application Ser. No. 07/658,844, filed Feb. 22, 1991, entitled "Distributed Multisite Switch Architecture"

The disclosure of each of these related copending applications is incorporated by reference.

FIELD OF THE INVENTION

This invention relates to radio frequency (RF) signal transmission systems interconnected by a multisite switch that routes command and audio transmission signals between the RF systems. The multisite switch has a distributed architecture of nodes wherein each node is coupled to one of the RF systems, such as a site controller or dispatcher console. In particular, this invention is directed to a common controller architecture for each node of the multisite switch.

BACKGROUND AND SUMMARY OF THE INVENTION

It is generally impractical for a single VHF/UHF RF repeater transmitting site to effectively serve a large geographical area. The broadcast area of a single site is limited by several factors. The effective radiated power of the antenna is subject to legal and practical limits. In addition, natural and man-made topographical features, such as mountains and buildings, block signals from certain locations.

Multiple transmitting sites are necessary to provide RF communications to all locations within a given locality. Multiple transmitters may be needed to cover a rural community covering many square miles or a city having many buildings. FIG. 1 is a schematic diagram of a simplified multiple-site system having three radio repeater (transmitting) central sites S1, S2, and S3 providing communications to geographic areas A1, A2, and A3, respectively. Mobile or portable transceivers within area A1 receive signals transmitted by site S1, transceivers within area A2 receive signals transmitted by site S2, and transceivers within area A3 receive signals transmitted by site S3. Each site has a site controller that acts as a central point for communications in the site. To enable communications from one area to another, a switch networks the radio systems together to establish audio slots connecting one site controller to another. Thus, a caller in one area can communicate with someone in another area.

The present invention is directed to a multisite RF trunked repeater system. Mulitsite allows a caller in one area (e.g. A1) to communicate with a callee in another area (e.g. A2). Multicast broadcasts signals only into those areas where the intended callee(s) is located. Moreover, in a multicast network, each site assigns a specific channel to a call independently of the channel assignments made by other sites. Thus, a single call may be broadcast from several site transmitters each operating on a different frequency.

In multisite, the site controller (S1) receives a call from a mobile radio in A1 requesting a channel to communicate with a specific callee. A caller requests a channel simply by pressing the push-to-talk (PTT) button on his microphone. This informs the site controller that a channel is requested. The PTT signal is transmitted to the unit on a control channel that is continuously monitored by the site controller. The site controller assigns a channel to the call and instructs the caller's radio unit to switch from the control channel to the channel assigned to the call. This assigned channel is applicable only within the area covered by the site.

In addition, the site controller sends the channel assignment to the multisite network switch. The switch assigns an internal audio slot to the call. The switch also sends a channel request to all other site controllers or to only those site controllers having a designated callee within their area. Upon receiving a channel request, these secondary site controllers assign a channel to the call. Again, each secondary channel is operative only in the area covered by the secondary site controller. The secondary site controller(s) also sends the channel assignment back up to the multisite switch. The caller can then communicate with a unit or group in an other area via the multisite switch. The call is initially transmitted to the primary site controller, routed through the assigned audio slot in the switch and retransmitted by the secondary sites on various assigned channels in those other areas.

When the caller ends the call, the primary site controller deactivates the assigned channel for that site and notifies the network switch that the call is terminated. There may be a brief "hang time" after the end of the call during which the channel remains assigned. During this hang time, the call can be rekeyed without going through the channel assignment procedure.

When the call is dropped, the network switch sends an end of call command to the secondary site controllers. A call is terminated in a similar format and operation as the slot assignment. Instead of establishing an audio slot, the end of call command causes the assigned slots and channels to be released.

In addition to providing communications between mobile radio units in different areas, the multisite network switch provides communications between dispatchers in different areas and between dispatchers and mobile radio units in different areas. The dispatcher consoles are connected to the network switch in the same manner as are the site controllers. A dispatcher console can issue a channel call request through the network switch to a site controller in another area to call a mobile unit or to another dispatcher console to call a dispatcher in another area.

In addition to all of the features that the mobile units have, each dispatcher console has the ability to participate in any call in its area or to its assigned groups. Thus, when a call comes through the network switch from another area to a mobile radio, the network switch informs the dispatcher console of the call in addition to notifying the site controller. The dispatcher can listen in or participate in the call to the mobile radio.

The network switch is also capable of handling calls to groups of mobile units and/or dispatcher consoles. The wide area switch manages group calls and monitors the network to ensure that the site controllers for all of the callees in the group assign a channel to the group call. If a channel is not assigned, the wide area switch advises the caller that the wide area call cannot be formed as requested. The caller then has the option of re-keying the call so as to reach those areas having assigned channels.

The present invention relates to a multisite switch having a distributed architecture. The logical functions of the switch are shared by various microprocessor operated nodes distributed throughout the switch. The nodes share the computational workload of the switch. Each node is connected to a site controller, dispatcher console, the system manager or other component of the overall radio system. The nodes coupled to site controllers are referred to as Master II Interface Modules (MIMs) and the nodes coupled to dispatcher consoles are referred to as Console Interface Modules (CIMs).

The distributed architecture of the multisite switch safeguards against catastrophic failures of the switch or of all communications from one RF system to another. The multisite switch does not completely fail if one card breaks down. Wide area communications, i.e., calls between site areas, continue despite the failure of a node. If a card fails, then the gateway to the network is closed only for its site controller or dispatcher console. Failure of a node prevents wide area communications only with respect to the site or console connected to the failed node. Mobile units in the area serviced by the failed card will not be able to call a unit in another area or receive calls from another area.

Local communications within an area are not disabled by the failure in the multisite switch. A site controller is not disabled by a failure of its associated node in the multisite switch. In particular, the failure of a MIM does not disable the site controller to which the MIM is connected. The site controller continues to operate and local communications within the area are unaffected by a failure in the multisite switch.

The ability to continue wide area calls after a node in the switch has failed provides several advantages to a distributed architecture switch over a central architecture switch. In a central architecture, a central processing unit (CPU) governs the operation of the switch. If this CPU fails, then the entire switch fails. Wide area communications are completely shut down by the failure of a multisite switch having a central architecture. As already stated, wide area communications are not completely shut down by a failure in a switch having a distributed architecture.

Distributed network multisite systems have a much faster data transfer rate than comparable central architecture multisite systems. Central computers process information serially. All communications passing through the switch must be serially processed by the central computer. The central computer slows communications because of its serial operation. Distributed network systems achieve parallel processing by sharing the computational task between several processors. Distributed networks are generally significantly faster than central computers.

Distributed network multisite systems are generally less expensive than multisite systems having a central computer. The hardware needed for a distributed network is a series of microprocessor controlled cards that handles communications between the multisite switch and the site central controllers, dispatcher consoles and various other users of the network. The cost of a series of cards is typically much less than that of a central computer. Moreover, a distributed network switch can be expanded simply by adding cards. To expand the capacity of a central computer requires purchasing a larger central computer.

Each node of a multisite network switch is supported by a switch controller card and one or more audio cards. These node units all have the same architecture and are interchangeable. The same controller cards and audio cards are used in all nodes.

The node architecture is novel and provides advantages over prior architectures used in RF trunking systems. The multisite node architecture provides for an interchangeable node unit that can be inserted in any node in the switch. The multisite switch can be serviced in the field by replacing the node unit. The service person need only stock one type of node unit to replace any node in the switch. The service technician no longer must stock a variety of components to service the switch or review voluminous manuals about the circuity in each of the various nodes. Similarly, a uniform node architecture reduces the complexity and costs of manufacturing.

The architecture of the node is also novel in that a single controller board supports a plurality of audio boards that themselves handle several audio channels. In the preferred embodiment, one controller board supports eight audio boards that each carry four audio/data channels. Thus, one controller board supports thirty-two (32) audio/data channels. The architecture of the node and its operation are specifically designed to enable a single controller board to handle a large number of audio boards and channels.

For example, the operational load on the controller board was minimized by assigning audio bus/slots to each channel for audio transmissions when the multisite switch is first enabled. Accordingly, when an audio transmission is received on a channel from the site controller the linkage between the channel and an audio bus/slot in the switch already exists. The controller board is free to process the channel assignment and related switch messages. The controller board does not have to divert its processing capacity to establish the linkage between the channel and bus/slot.

In addition, the controller board architecture has two principal processing units. The first is an interface microprocessor that is responsible for most of the logical processing functions of the node and the other is a communications controller that routes command messages between the interface processor, the internal switch message bus and the external serial link to the RF site, dispatcher console or other RF unit. The controller card also has a dual-port RAM memory which conveys messages and other communications between the interface processor and the communications controller.

The communications controller is principally a message router. Once a valid message is received at the node, the communications controller loads the message into the dual-port RAM and signals the interface processor that it has a message waiting. The interface processor retrieves the message and processes it accordingly. Similarly, the interface processor generates messages for transmission to the site or dispatcher, or for broadcast on the switch message bus. The processor loads its message in the dual-port RAM and notifies the communications controller that a message is waiting. The communications controller retrieves the message and routes it to the message bus or to the external serial port depending upon the address of the message within the dual-port RAM. The dual-port RAM is segregated into memory buffer packets. Each packet is allocated for messages either to and from the message bus, the external serial port, and the interface processor.

This controller board architecture enables a single interface processor to handle the processing requirements for a node in the distributed multisite switch. The architecture insulates the interface processor so that it is reserved for message processing and is not required to perform message routing functions. These message routing functions are performed by the communications controller.

While the communications controller sends all types of messages to the interface processor via the dual-port RAM, the controller does not send redundant messages to the processor. A large portion of the message traffic on the switch message bus relates to the status of each of the audio bus/slots in the switch. One of the few processing functions of the communications controller is to discard all redundant bus/slot status messages. This function of processing bus/slot status messages is more fully described in application Ser. No. 07/658,640, filed Feb. 22, 1991, entitled message "Bus Slot Update/Idle Control In RF Trunking Multisite Switch" cited above. Accordingly, the novel architecture of the controller board enables the node to use its processing capability to handle the node's share of the processing load of the switch.

In addition to those described above, there are many other advantages of the multisite RF system over conventional RF trunked systems. Many of these advantages are apparent from the following detailed description of the invention.

DETAILED DESCRIPTION OF THE DRAWINGS

Figure 1:
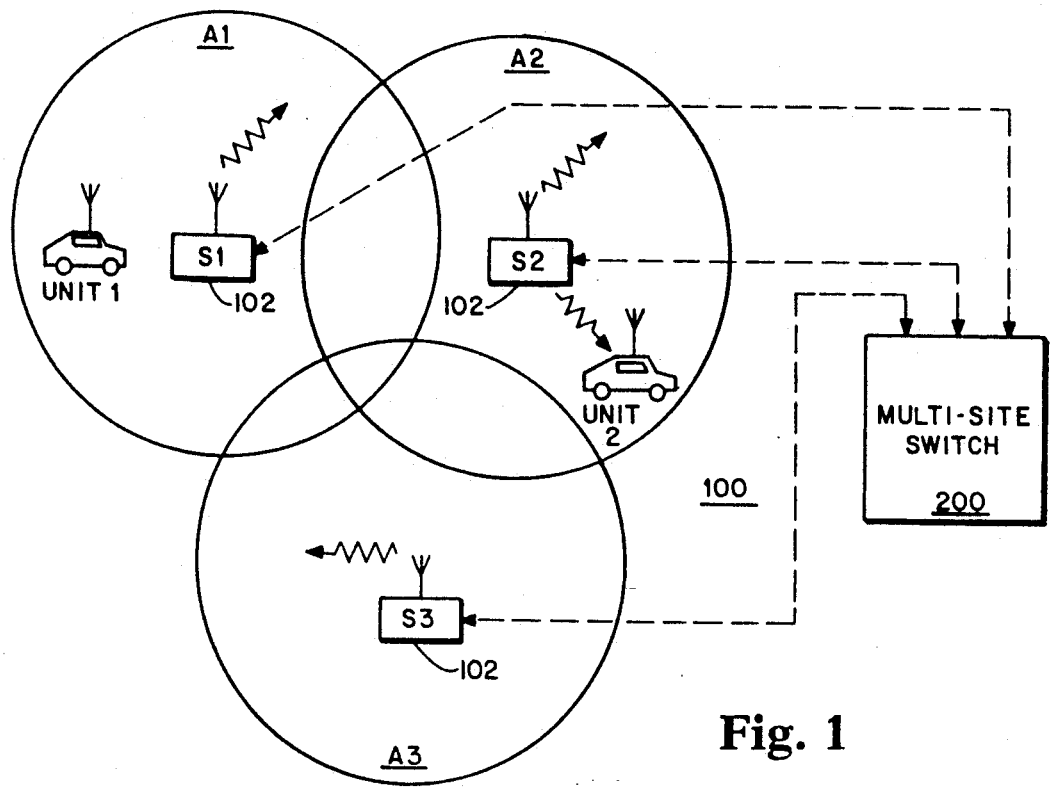
FIG. 1 is an illustration of three site radio system networked together by a multisite switch.

An exemplary trunked radio repeater system in accordance with the invention is generally depicted in FIG. 1. Individual remote units communicate with each other through shared radio repeaters that are part of the trunked repeater system 100. The system is composed of several sites 102. Each site includes a site transceiver that broadcasts signals over a certain area and a site controller. For example, site S1 broadcasts over area A1. The remote units can communicate with units within their own area or with units in other areas. The remote units also communicate with the dispatcher consoles.

Each site is controlled by a site controller, e.g., S1. The site controller controls the radio frequency data and audio traffic in its area. The site controller is described in more detail in the application and patents previously mentioned. For purposes here, each site controller communicates with the multisite switch 200. The multisite switch routes communications between sites and dispatch consoles.

Figure 2:
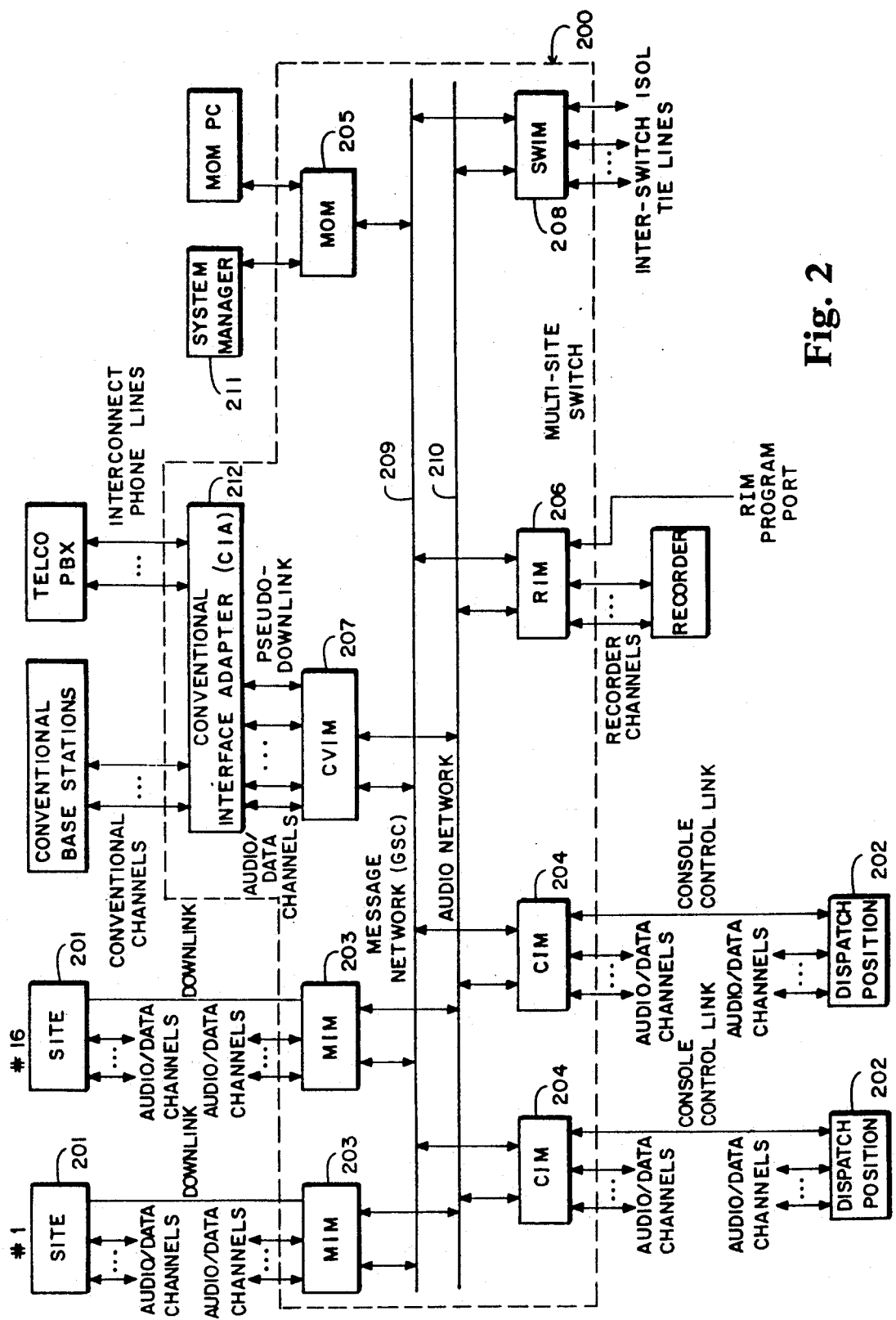
FIG. 2 is a schematic of the architecture for a distributed network multisite.

Communications between sites are conducted through the multisite stitch 200 shown in FIG. 2. The multisite switch communicates with each site controller 201 and dispatcher console 202. There are data and audio communication lines between the multisite switch and each site controller and dispatcher console.

The primary responsibility of the multisite switch is to establish and remove audio connections between sites and dispatch consoles. The multisite switch comprises a local area network of nodes. As shown in FIG. 2, the nodes are labelled corresponding to whether they interface with a site controller, dispatcher console or other system component. For example, MIMs 203 are nodes in the switch that interface with site controllers and CIMs 204 are nodes that interface with dispatcher consoles. There are other nodes such as a Monitor Module (MOM) 205, Recorder Interface Module (RIM) 206, Conventional Interface Module (CVIM) 207 and a Switch Interconnect Module (SWIM) 208.

The MOM 205 is the interface for the system manager and the MOM PC (personal computer) that have supervisory responsibility for the switch and overall radio system. The system manager updates the databases in all of the nodes. The MOM maintains certain centralized databases including databases for smart calls and confirmed calls. Smart calls relate to the operation of the dispatcher console. A call is "smart" if the call has been selected, i.e., being listened to by the dispatcher via a select speaker in the console. If the call is not selected by at least one console, then a flashing indicator light appears on certain consoles. Thus, several dispatchers can readily see which calls are not being monitored by at least one dispatcher. Confirmed calls require participation of all of the intended callees. A confirmed call can begin audio transmission only after all of the sites having intended callees have confirmed the assignment of channels for the call.

Each node in the multisite switch is supported by a microprocessor controlled communications card. All of the cards for the MIMs, CIMs, CVIM, MOM, RIM and SWIM have the same hardware and are interchangeable. The cards are said to have different personalities to indicate that they are assigned to, for example, a site controller or a dispatcher console (dispatch position). Each card can be easily configured to be a MIM, CIM, etc., by setting a few switches on the card. Thus, the cards are truly interchangeable.

The nodes of the switch are each connected to a digital message bus 209 and one or more digital audio buses 210. The message bus 209 is shown in FIG. 2 as a message network using an Intel 80C152 Global Serial Channel (GSC) microprocessor. This GSC microprocessor is the communications controller in the controller card in each node. The message bus is a high speed data bus that resides in the GSC microprocessor. The message bus interconnects the communications controllers in the controller card of each node.

The audio bus 210 comprises 32 time division multiplexed buses. Each bus contains 32 slots that each carry a single audio channel. A maximum of 1024 audio slots may be routed through the switch (32 buses×32 slots). The slots are assigned to individual nodes and are coupled to the audio boards in the nodes. The operation of the audio slots and the audio boards are described in more detail in application Ser. No. 07/658,636, entitled "Audio Routing Within Trunked Radio Frequency Multisite Switch" which is further identified above.

Figure 3:
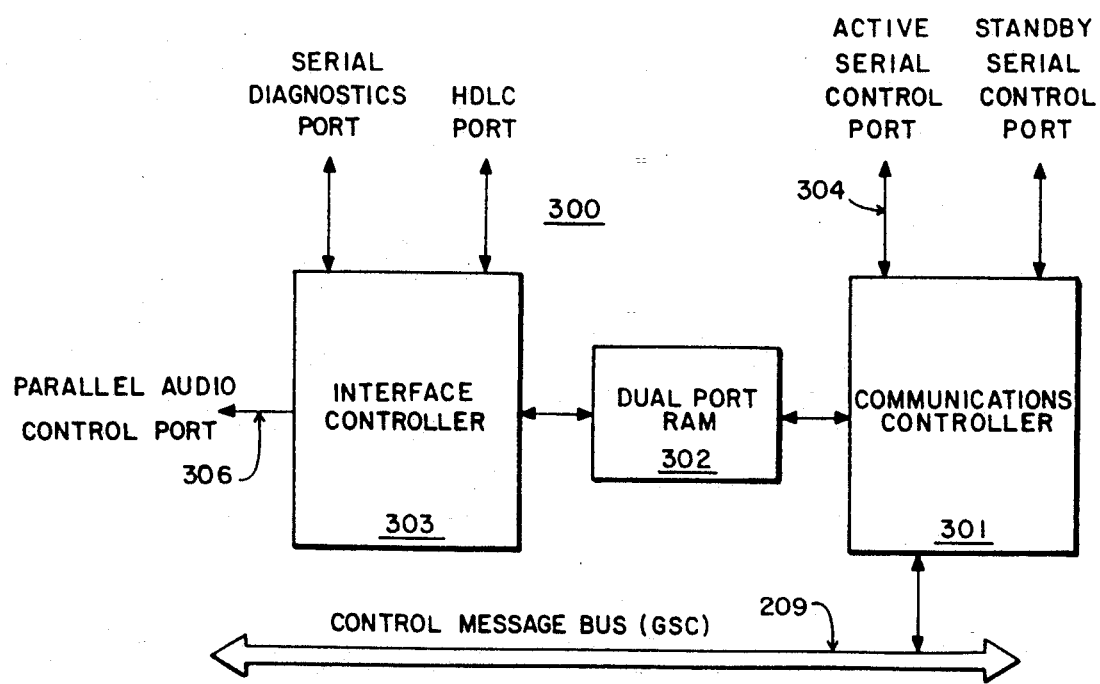
FIG. 3 is a general block diagram of the architecture of a node in the multisite switch.

FIG. 3 shows a block diagram of a controller card 300. This diagram is applicable to all of the nodes of the switch except for the conventional interface adapter (CIA). Thus, the hardware for the MIM, CVIM, MIM, SMIM, RIM and CIM is a switch controller card. Each card includes a communications controller 301, a dual-port random-access-memory (RAM) chip (302) and an interface processor 303.

The communications controller 301 is a message router. It routes messages between the control message bus 209, the serial port leading outside of the switch 304, and the interface processor 303 in the node through the dual-port RAM 302. In the present embodiment, the communications controller is an Intel 80C152 GSC microprocessor. The communications controller is coupled to the GSC message bus 209. This controller places messages onto the bus and receives messages from the bus. Messages received from the site controller over the serial port 304 are translated into a format usable by the multisite switch. The communications controller also translates switch messages into a format that the site controller understands.

The interface processor 303 performs substantially all logical functions for the node. In effect, the interface processor is the intelligence for the node. The interface processor, in this embodiment, is an Intel 80C186 microprocessor. The interface processor acts as a switch for the audio network and assigns audio switch slots to active audio site channels by operating the audio boards in the node via the parallel audio control port 306.

Each call through the switch is assigned a slot by the host MIM or CIM on the audio bus. When the call is terminated, the host node cancels the call and makes the slot available for assignment to another call. The interface processor for each MIM and CIM assigns slots, connects audio slots to the site controller or dispatcher console to establish a communications link, and terminates slots. Since all MIMs and CIMs perform these functions, they must continually inform each other and the other nodes of their slot assignments. Accordingly, the MIMs and CIMs send messages regarding slot assignments, slot updates and slot idles over the message network 209 to other nodes.

The communications controller 301 for each secondary node initially processes all of the messages on the message network. Slot assignments are forwarded to the interface processor through the dual-port RAM. Redundant slot update/slot idle messages are not forwarded to the interface processor by the communications controller. Messages regarding slot updates or idle slots are processed by the communications controller by referring to a slot bit map located in the dual-port RAM storage 302. By referring to the slot bit map, the communications controller determines whether the slot status message conveys redundant information already known to the node, or if the slot status message conveys new information about the slot. Update messages are sent periodically by a primary (host) MIM to confirm to the other nodes the active status of a slot. When a primary MIM terminates a call it sends a slot idle message to the other nodes. The primary MIM also periodically resends idle messages until the slot is reassigned to another call. Thus, all nodes are continually informed of the status of all slots that have been assigned at least once. A more complete disclosure of the slot/bus idle message is contained in application Ser. No. 07/658,640, entitled message "Bus Slot Update/Idle Control In RF Trunking Multisite Switch" and further identified above.

Figure 4:
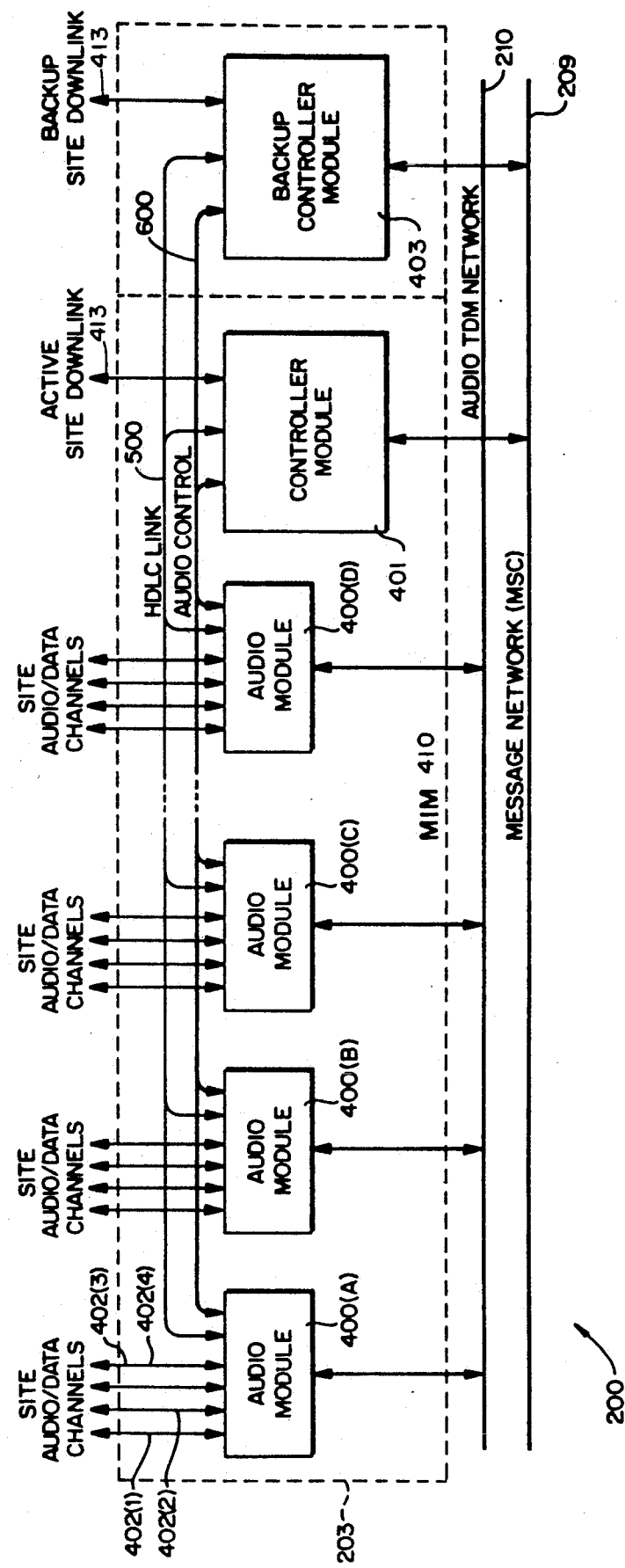
FIG. 4 is a diagram showing the architecture of a multisite node.

FIG. 4 is a block diagram of a MIM node of the multisite switch. Each node of the switch is identical except for its DIP switch settings. The DIP switch settings establish the personality of the node, such as MIM, CIM or RIM. Although FIG. 4 shows a node in a MIM 410 configuration, the figure also depicts the CIM, RIM, CVIM, MOM and SWIM nodes. However, the MOM does not have audio boards, and the MIMs are the only nodes with a backup controller board.

In the preferred embodiment, each node comprises a controller board 401, a backup controller board 403 and up to eight audio boards 400 (A-D). The controller and backup controller boards are identical and perform the same function. However, the backup controller board becomes active only when the controller board fails. The controller board performs the logical functions for the node such as assigning audio slots on one of the audio buses 210 to audio/data channels 402 (1-4) from the site controller. The controller board also processes messages received from the message bus 209 and from the site over a serial downlink 413.

The controller board is the fundamental processing unit within the multisite switch. The logic processing of the distributed architecture switch is shared by each of the nodes in the switch. Accordingly, the processing of the nodes, and of the switch, is principally performed in the controller boards in the nodes.

The audio boards 400(A-D) link the audio/data channels from the site to the audio bus/slot network within the multisite switch. In the preferred embodiment, each audio board supports four audio channel links to the site and, thus, handles up to four audio/data transmissions at one time. Each audio board has a discrete circuit for each channel that transfers digital audio/data between the site channel and the switch bus/slot. The audio boards are described in greater detail in application Ser. No. 07/658,636, filed Feb. 22, 1991, entitled "Audio Routing Within Trunked Radio Frequency Multisite Switch" further identified above.

The controller board sends command signals directly to the audio boards over two interfaces. The first interface is a HSCX-based HDLC port 500 and the second is a PPI-based audio control port. Both of these ports are coupled directly to the interface processor in each of the controller boards. The HSCS port is a 360 K bit serial data bus using a HDLC protocol between controller board and the audio processor on the audio board. The audio control port is a parallel data bus between controller board and control circuit on audio board.

Figure 5:
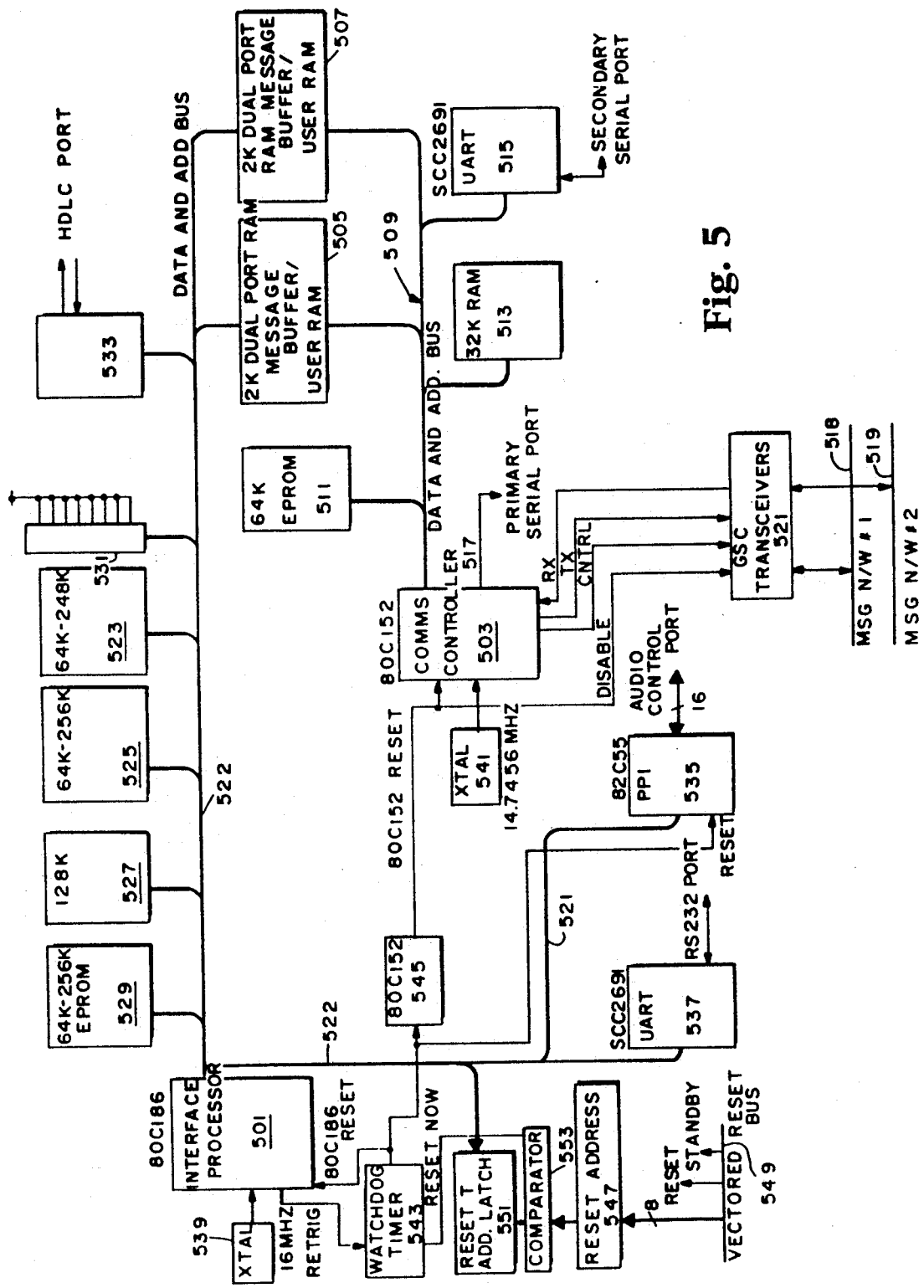
FIG. 5 is a schematic diagram of the controller board for a multisite node.

FIG. 5 is a schematic diagram of a controller board that is shown in block diagram form in FIG. 3. The interface processor 501 and communications controller 503 are the principal processing devices on the board.

There are two dual-port RAMs 505, 507 through which the processor and controller communicate with each other. In the preferred embodiment, the dual-port RAMs each have 2 K bytes of memory space. The dual-port RAMs perform different functions. One of the dual-port RAMs 505 holds the bus/slot bit map that indicates the status of each audio slot in every audio bus in the switch. In addition, this RAM 505 is also used as a scratch pad memory by the interface processor and/or communications controller. The other dual-port RAM 507 is used to transfer messages between the interface processor and communications controller. This dual-port RAM is described in more detail below.

The communications controller is coupled to the dual-port RAM by a data and address bus 509. This bus also connects the controller to a nonvolatile EPROM 511, a volatile RAM 513 and a UART standard serial interface 515. In the preferred embodiment, the RAM 513 is not used and the UART is a secondary backup serial port. The EPROM 511 contains 64 K bytes of memory and holds the programs executed by the communications processor.

The primary serial port 517 is embedded within the communications and is a standard RS-232 port as is the UART. These serial ports couple the communications controller to the RF site controller, dispatcher console or other unit to which the particular node is assigned. In the preferred embodiment, land lines connect these units to the multisite switch. It is within the scope of this invention to use RF, microwave, optical or other means for conveying signals to the switch.

In the preferred embodiment, there is a trunking card or downlink trunking card associated with the site controller that receives the serial communications from the serial port to the multisite switch. Trunking cards and downlink trunking cards are fully disclosed in application Ser. No. 07/532,164, filed Jun. 5, 1990, entitled "Fail-Soft Architecture for Public Trunking System" that is cited above. Trunking cards and downlink trunking cards are a common interface unit used in the assignee's trunked radio systems. Accordingly, the multisite switch is able to communicate with existing trunked radio systems using existing trunking card interfaces.

The communications controller 503 is connected to the multisite message bus 518 and the backup message bus 519 via a standard GSC transceiver 521. There are separate receive (RX), transmit (TX) and control (CNTRL) lines between the communications controller and the GSC transceiver. The communications controller sends a control signal to the transceiver to notify the transceiver when a message is to be transmitted from the communications controller. Upon receiving a transmit control signal, the transceiver acts to accept a message from the communications controller and place the message on the message bus.

The interface processor 501 processes messages for the node. The interface processor receives messages from the communications processor via the dual-port RAM. The specification for the messages is set forth in application Ser. No. 07/573,977, entitled "Distributed Multisite Coordination System" that is further identified above. In addition the specification for internal messages within the controller board, i.e., between the communications controller and the interface processor, is set forth below. The processor is held in a waiting status until it is notified of a pending message in the dual-port RAM by the communications controller. Thus, the operation of the interface processor acts almost exclusively in response to messages.

The interface processor is supported by several other components on the controller board. There is an address/data bus 522 that allows the processor to communicate with these other components on the controller board. To perform its logic tasks, the interface processor has available to it an NVRAM 523 providing 248 K bytes of non-volatile RAM, a total of 384 K bytes of user RAM in two volatile RAMs 525 and 527, and an EPROM 529 containing the code for the processor. The interface processor is also coupled to the DIP switch 531 that determines the personality of the board, e.g., MIM or CIM, and is manually set upon installation of the board.

The interface processor is responsible for maintaining the audio processing database for the audio boards in its node. In the preferred embodiment there are one to eight audio boards in a node and each board carries four audio channels. The interface processor communicates directly to the audio boards via an HSCX-based HDLC port 533 and a PPI-based audio control port 535. The audio control port conveys nearly all of the signal commands between the interface processor and the audio boards. The audio control port is a 16 line bus where each line is associated with a specific command. The list of the commands and their corresponding line on the audio control port are presented in Table A.

TABLE A

| PPI Lines: | |
| --- | --- |
| 8 bit data: | DB0–DB7 |
| 8 bit control lines | |
| ENBL0 = | data latch enable |
| ENBL1 = | not used |
| ENBL2 = | channel function latch |
| ENBL3 = | write codec enable |
| ENBL4 = | clock select enable |
| ENBL5 = | not used |
| ENBL6 = | clear line |
| ENBL7 = | channel address latch |

The HDLC port is used principally for fault detection and for conveying messages from the audio board's I/O ports to the interface processor. These I/O ports receive signals from site controllers regarding particular audio channels. For example, if a channel link fails, then the audio board detects the failure and reports it to the interface processor over the HDLC link.

The interface processor also has its own RS232 serial port through UART 537. This port is for diagnostic purposes. The interface processor can be accessed directly by using this serial port to bypass the communications controller. This serial link allows an operator using a supervisory or diagnostic unit to interact directly with the interface processor.

The controller board also has peripheral circuitry to maintain the interface processor and the communications controller. There is a 25 MHz clock 539 for the interface processor and a 14.7456 MHz clock 541 for the communications controller that clocks messages to and from the message bus. The operation of the interface processor is monitored by a watch-dog timer 543 that must be regularly reset by the processor or the timer will reset the processor and communications controller via a reset delay latch 545. In addition, the watch-dog timer also disables the GSC transceiver 521 when it resets the controller board to prevent the transmission or reception of messages during the reset operation. In the preferred embodiment, the watch-dog timer is reset every 0.48 seconds when the processor activates the RETRIG line to the timer.

Similarly, there is a hardwired-based vectored reset circuit including a first reset address latch 547 that is coupled to a 8-bit wide vectored reset bus 549, a second reset address latch 551 coupled to the bus 522, and a comparator 553 for comparing the two latched addresses. Since the vectored reset circuits are independent of the message bus, the processors on the controller board can be reset by the MOM even when they refuse to respond to messages on the message bus. To use the vector reset bus, the MOM sends a vector address directly to the vector bus on the controller card. Any controller card with the same address will be enabled to receive the next command (a reset or standby command) from the MOM via the vector reset bus. If the next command is to reset operation the controller board, then the MOM sends a reset data bit via the vector reset bus to the controller board followed by a latch data bit. If the controller board is to be placed in a standby mode, then the MOM sends a standby data bit followed by a latch data bit to the vector bus.

Figure 6:
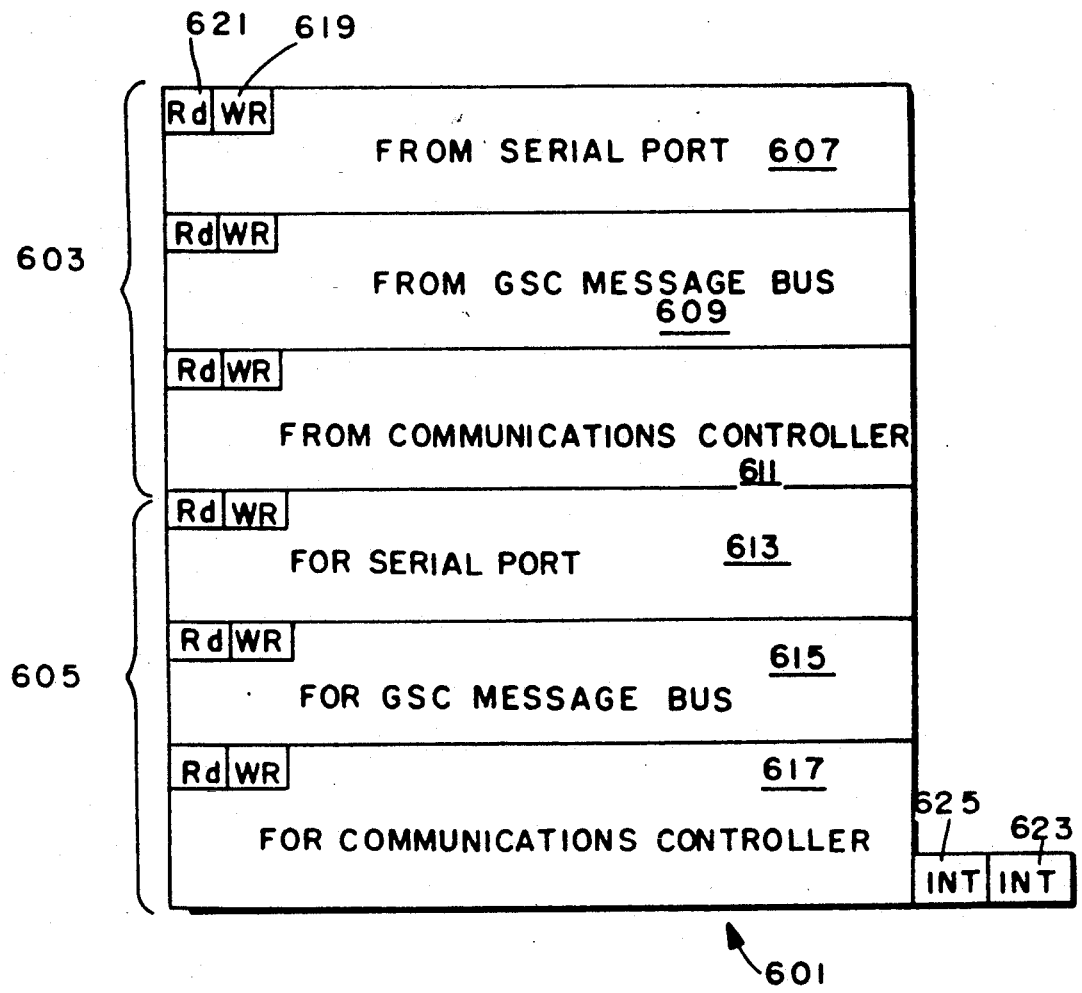
FIG. 6 is a memory buffer diagram for one of the dual-port RAMs in the controller board.

FIG. 6 shows the segregation of the dual-port RAM used for transferring messages between the interface processor and communications controller. The dual-port RAM acts as a message box for the interface processor and communications controller. Messages flowing between the processor and controller are posted in the dual-port RAM until the interface processor has an opportunity to receive the message.

The message memory locations 601 in this dual-port RAM are segregated into buffer packets to identify the source of the message. The dual-port RAM memory consists of six buffer packets of which three packets 603 are allocated to the communications controller and the other three packets 605 are allocated to the interface processor. Each buffer packet is capable of holding eight (8) 32-byte messages.

With respect to the memory buffer packets allocated to the communications controller, one packet 607 holds messages from the external serial port, a second packet 609 holds messages from the GSC message bus, and a third packet 611 holds messages generated by the communications controller for the interface processor. The communications controller loads messages into the appropriate buffer packet in the dual-port memory depending on the source of the message.

For example, when the communications controller receives a valid message from the site controller via the serial port, the controller routes the message to the interface processor by placing the message in the packet 607 allocated to messages from the serial port. When retrieving message, the interface processor knows that the message came from the site via the serial port because of the packet which contains the message in the dual-port RAM. Accordingly, the interface processor knows the source of a message by its location, e.g., buffer packet, in the dual-port RAM.

Similarly, when the interface processor generates a message, it places the message in one of the three buffer packets 605 in the dual-port RAM that is allocated to its messages. The interface processor places messages to be sent through the serial port to the site controller in buffer packet 613, messages to be broadcast on the message bus in packet 615, and messages for the communications processor in packet 617. The communications controller knows where to route the message by its location in the dual-port RAM.

There are read and write indices and interrupts associated with each buffer packet in the dual-port RAM. These indices inform the communications controller and interface processor how many messages are pending in each buffer packet. For example, in the buffer packet 607 that is allocated for messages from the serial port to the interface processor, a write counter 619 is incremented by the communications controller each time a message in placed in that buffer packet. Similarly, each time a message is read by the interface processor from packet 607 the read count in 621 is incremented. Accordingly, the interface processor can determine if it has read all the messages in packet 607 by comparing the read and write indices.

When a message is placed in packet 607 of the dual-port RAM for the interface processor by the communications controller, the controller increments the write index and sets an interrupt 623 that notifies the interface processor that it has a message pending. If the controller finds eight messages already in the packet and, thus, cannot insert another message, the controller issues an overflow message to the interface processor via packet 611. Assuming that the message is placed in the packet, the interface processor retrieves the message when it has an opportunity to do so as part of its processing routine. Similarly, when the interface processor places a message in the dual-port RAM for the communications controller, the processor increments the appropriate write counter in one of the packets 605 and sets an interrupt 625 that notifies the communications controller that it has a pending message. Accordingly, in this way the communications controller and interface processor communicate with one another via the dual-port RAM.

The interprocessor messages within a controller board for the preferred embodiment are described below.

GSC Traffic Update Message

The communications controller sends the interface processor a GSC Traffic Update message at 30 ms intervals. A low pass filter is applied to this data to produce an average load figure for the traffic on the message bus. This figure is then compared to a threshold constant. If the average traffic volume is above the threshold, then the node does not execute its slot updating message generation task. If the traffic volume is below the threshold, the node's update process is invoked.

| | GSC-TRAFFIC_UPDATE (127) | |
|---|---|---|
| # Bytes | Field | Function |
| (1) | message_id | GSC_TRAFFIC_UPDATE |
| (1) | msg_count | count of GSC messages |
| (2) | byte_count | count of GSC bytes |

Buffer Overflow Message

The communications controller sends the interface processor a buffer overflow message at 0.8 second intervals. The interface processor records this overflow data in RAM, and provides it to the MOM upon receipt of a status request.

| | BUFFER_OVERFLOW (128) | |
|---|---|---|
| # Bytes | Field | Function |
| (1) | message_id | C152_BUFFER_OVERFLOW |

-continued

| BUFFER_OVERFLOW (128) | | |
|---|---|---|
| # Bytes | Field | Function |
| (2) | serial_ovfl | C152 serial port buffer overflow count |
| (2) | gsc_ovfl | C152 GSC buffer overflow count |
| (2) | to_186_ovfl | C152 to C186 buffer overflow count |

GSC Error Count Message

The communications controller sends the interface processor a GSC message bus error count message at 0.8 second intervals. The interface processor records this message bus error data in RAM, and provides it to the MOM upon receipt of a status request.

| GSC_ERROR_COUNT (129) | | |
|---|---|---|
| # Bytes | Field | Function |
| (1) | message_id | GSC_ERROR_COUNT |
| (2) | gsc_rx_error | GSC receive error count |
| (2) | gsc_tx_error | GSC transmit error count |

Serial/Interprocessor Message

This message allows the communications controller to originate its own messages and receive serial messages. The communications controller generates a message and places it in the dual-port RAM buffer packet for serial transmit or the packet for interprocessor messages. Upon receipt of a SERIAL_INTER_PROC message, the interface processor simply routes the message back to the serial transmit or interprocessor buffer in the dual port RAM for the communications controller. This procedure enables the communications controller to handle low-level protocol within the normal message routing.

| SERIAL_INTER_PROC (126) | | |
|---|---|---|
| # Bytes | Field | Function |
| (1) | message_id | SERIAL_INTER_PROC |
| (n) | variable length message | |

GSC/Interprocessor Message

As with the serial/interprocessor message, the GSC/interprocessor message provides the communications controller with a method of routing messages to and from its GSC transmit and interprocessor buffers via the interface processor.

| GSC_INTER_PROC (118) | | |
|---|---|---|
| # Bytes | Field | Function |
| (1) | message_id | GSC_INTER_PROC |
| (n) | variable length message | |

Interprocessor Message Transactions

The following message types are used by the communications controller and the interface processor to communicate with each other. Interprocessor messages are labeled to indicate the source of the message.

The message type byte is communicated to the receiving processor or controller by writing to reserved locations in the dual-port RAM as is described above. Using the memory map for the interface processor, the location 02FFE is written to by the communications controller for a transfer to the processor. Similarly, the interface processor writes to location 02FFC in the dual-port RAM for transfers in to the communications controller. The format of the message type byte is shown below.

| 02FFC OR 02FFE | R1 | R0 | < MESSAGE_TYPE_BITS > |
|---|---|---|---|

The two flags R1,R0 are not currently used and are reserved for an as of yet undefined function. The six remaining bits are used for the message type byte. Table B contains a list of system message types.

TABLE B

| Type Byte | Function |
|---|---|
| 00 | Serial I/0 (data to/from a site, console, etc.). |
| 01 | Global Serial Channel I/0. Enables nodes to communicate with one another. |
| 02 | Interprocessor I/0. Enables the two processors on a Controller Card to communicate with one another. |

While the invention has been described in its preferred embodiment, it si not limited to this embodiment. To the contrary, the invention covers various modifications and equivalent arrangements included within the spirit and scope of the appended claims.

What is claimed is:

1. In a local area network for a radio frequency multicasting system including a multisite switch having a distributed architecture of nodes connected to a message bus and a plurality of audio bus/slots, each node comprises:
   a plurality of audio cards operatively coupled to said audio bus/slots and to audio channels from an RF site or dispatcher console, said audio cards linking individual audio channels from the RF site or dispatcher console to selected bus/slots in said switch;
   a controller card operatively coupled to said audio cards, said controller card causing said audio boards to link individual audio channels to bus/slots selected by said controller card, said controller card operatively coupled to said message bus and to an external message link to said RF site or dispatcher console.

2. In a local area network for a radio frequency multicasting system including a multisite switch having a distributed architecture of nodes connected to a message bus and a plurality of audio bus/slots, each node comprises:
   a plurality of audio cards operatively coupled to said audio bus/slots and to audio channels from an RF site or dispatcher console, said audio cards linking individual audio channels from the RF site or dispatcher console to selected bus/slots in said switch;
   a controller card operatively coupled to said audio cards, said controller card causing said audio boards to link individual audio channels to bus/slots selected by said controller card, said controller card operatively coupled to said message bus and to an external message link to said RF site or dispatcher console, and
   wherein said controller card comprises an interface processor and a communications controller, said communications controller routing message between said message bus, said RF site or dispatcher console and said interface processor, said interface processor operatively coupled to said communications controller, said interface processor receiving messages from said communications controller and in response to said messages signalling said audio boards to establish audio links between selected channels and selected bus/slots.

3. A node in a multisite switch as in claim 1 further comprising a dynamic addressing means for assigning a unique address to said node to identify said node in said switch.

4. A node in a multisite switch as in claim 2 further comprising a memory unit accessible by said communications controller and said interface processor, said memory unit having a bus/slot bit map representative of the status of each audio bus/slot and said communications controller having redundant message discard means for discarding redundant slot status messages.

* * * * *

UNITED STATES PATENT AND TRADEMARK OFFICE
CERTIFICATE OF CORRECTION

PATENT NO.   : 5,239,538
DATED        : August 24, 1993
INVENTOR(S)  : James L. TEEL, Jr. et al It is certified that error appears in the above-indentified patent and that said Letters Patent is hereby corrected as shown below:

On the title page, item [75], the last inventor's name is misspelled. The correct spelling is:

--Wim A. IMRON--

Signed and Sealed this

Twenty-second Day of March, 1994

Attest:

BRUCE LEHMAN

*Attesting Officer*         *Commissioner of Patents and Trademarks*